(12) United States Patent  
Cheng

(10) Patent No.: US 8,011,787 B2
(45) Date of Patent: Sep. 6, 2011

(54) IMAGE PROJECTION AND DETECTION APPARATUS

(75) Inventor: Chu-Ming Cheng, Hsinchu (TW)

(73) Assignee: Young Optics Inc., Hsinchu (TW)

( * ) Notice: Subject to any disclaimer, the term of this patent is extended or adjusted under 35 U.S.C. 154(b) by 289 days.

(21) Appl. No.: 12/481,843

(22) Filed: Jun. 10, 2009

(65) Prior Publication Data
US 2010/0091253 A1  Apr. 15, 2010

(30) Foreign Application Priority Data
Oct. 14, 2008  (TW) ................ 97139420 A

(51) Int. Cl.
G02B 27/02 (2006.01)
G02B 27/14 (2006.01)
(52) U.S. Cl. .......................... 353/33; 353/81
(58) Field of Classification Search .............. 353/33, 353/81; 359/438, 496, 638, 222, 261, 263, 359/317, 318
See application file for complete search history.

(56) References Cited

U.S. PATENT DOCUMENTS

| 7,207,678 | B2 * | 4/2007 | Penn | 353/81 |
| 2007/0058142 | A1 * | 3/2007 | Radominski et al. | 353/99 |
| 2007/0252086 | A1 * | 11/2007 | Chou et al. | 250/353 |
| 2010/0149493 | A1 * | 6/2010 | Penn et al. | 353/20 |

* cited by examiner

Primary Examiner — Tony Ko
(74) Attorney, Agent, or Firm — J.C. Patents

(57) ABSTRACT

An image projection and detection apparatus including an illumination system, a digital micro-mirror device (DMD), an optical detector, and a total internal reflection (TIR) unit is provided. The illumination system provides an illumination beam. The DMD is disposed in an optical path of the illumination beam, and includes a plurality of micro-mirror structures switched between an on-state and an off-state. When at least a part of the micro-mirror structures are in the on-state, they reflect the illumination beam into an image beam transmitted to an object side. When at least a part of micro-mirror structures are in the off-state, they reflect an object beam from the object side to the optical detector. The TIR unit includes a first TIR surface and a second TIR surface. The first TIR surface totally reflects the illumination beam to the DMD. The second TIR surface totally reflects the object beam to the optical detector.

12 Claims, 5 Drawing Sheets

IMAGE PROJECTION AND DETECTION APPARATUS

CROSS-REFERENCE TO RELATED APPLICATION

This application claims the priority benefit of Taiwan application serial no. 97139420, filed on Oct. 14, 2008. The entirety of the above-mentioned patent application is hereby incorporated by reference herein and made a part of this specification.

BACKGROUND OF THE INVENTION

1. Field of the Invention

The present invention relates to an optical apparatus. More particularly, the present invention relates to an image projection and detection apparatus having both image projection and image detection functions.

2. Description of Related Art

FIG. 1A is a structural diagram illustrating a conventional image projection and detection apparatus in an image projecting state. FIG. 1B is a structural diagram illustrating the conventional image projection and detection apparatus of FIG. 1A in an image detecting state. Referring to FIG. 1A and FIG. 1B, the conventional image projection and detection apparatus 100 includes an illumination system 110, a liquid crystal panel 120, an imaging lens 130, an optical detector 140, a reflection mirror 150 and an actuator 160.

Referring to FIG. 1A first, when the image projection and detection apparatus 100 performs image projection, the illumination system 110 provides an illumination beam 112, and the liquid crystal panel 120 converts the illumination beam 112 into an image beam 122. At this time, the reflection mirror 150 is in a first position P1 and reflects the image beam 122 to the imaging lens 130, and the imaging lens 130 projects the image beam 122 to a screen 50 to form image frames.

Referring to FIG. 1B, when the image projection and detection apparatus 100 performs image detection, the actuator 160 pivotally switches the reflection mirror 150 from the first position P1 to a second position P2, so that the imaging lens 130 may image an object beam 62 from an object 60 onto the optical detector 140, and meanwhile the object beam 62 is not intercepted by the reflection mirror 150. Therefore, the optical detector 140 may detect an image of the object 60.

The conventional image projection and detection apparatus 100 has to use the actuator 160 to switch between an image projection function and an image detection function. However, application of the actuator 160 complicates the structure of the image projection and detection apparatus 100, and increases the size of the image projection and detection apparatus 100. Moreover, additional application of the actuator 160 also increases the material cost of the image projection and detection apparatus 100.

SUMMARY OF THE INVENTION

The invention is directed to an image projection and detection apparatus, which has both image projection and image detection functions, and has a relatively simple structure.

Additional aspects and advantages of the present invention will be set forth in the description of the techniques disclosed in the present invention.

An embodiment of the invention provides an image projection and detection apparatus including an illumination system, a digital micro-mirror device (DMD), an optical detector and a total internal reflection (TIR) unit. The illumination system is capable of providing an illumination beam. The DMD is disposed in an optical path of the illumination beam, and includes a plurality of micro-mirror structures. Each of the micro-mirror structures is capable of being switched between an on-state and an off-state. When at least a part of the micro-mirror structures are in the on-state, they reflect the illumination beam into an image beam, and the image beam is transmitted to an object side. When at least a part of the micro-mirror structures are in the off-state, they reflect an object beam from the object side to the optical detector. The TIR unit includes a first prism and a second prism. The first prism has a light-incident surface and a first total reflection surface. The illumination beam from the illumination system enters the first prism through the light-incident surface, and is totally reflected to the DMD by the first total reflection surface. The image beam formed by the reflection of at least a part of the micro-mirror structures in the on-state passes through the first total reflection surface and is transmitted to the object side, and the object beam from the object side passes through the first total reflection surface and is transmitted to the DMD. The second prism has a first optical surface and a second total reflection surface. A first gap is maintained between the first optical surface and the first total reflection surface. The object beam reflected by at least a part of the micro-mirror structures in the off-state sequentially passes through the first total reflection surface, the first gap and the first optical surface, and is totally reflected to the optical detector by the second total reflection surface.

In the image projection and detection apparatus according to the embodiments of the present invention, the optical path of the image beam during image projection and the optical path of the object beam during image detection may be respectively formed by the on-state and off-state of the micro-mirror structures of the DMD, and generation of the optical paths for the image projection and image detection is not relied on other devices. Therefore, the image projection and detection apparatus of the invention has a relatively simple structure, and accordingly has a relatively small size and a low cost.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1A:
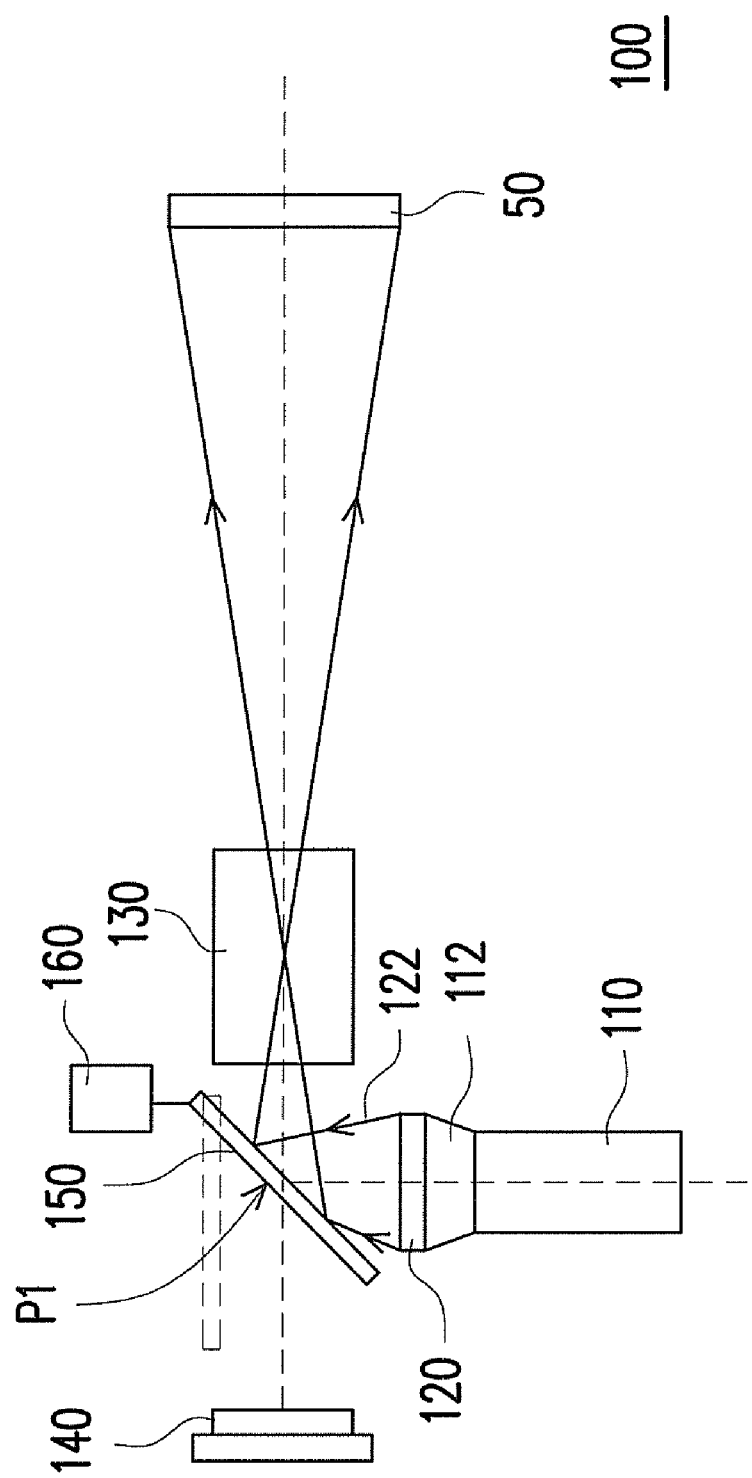
FIG. 1A is a structural diagram illustrating a conventional image projection and detection apparatus in an image projecting state.
Figure 1B:
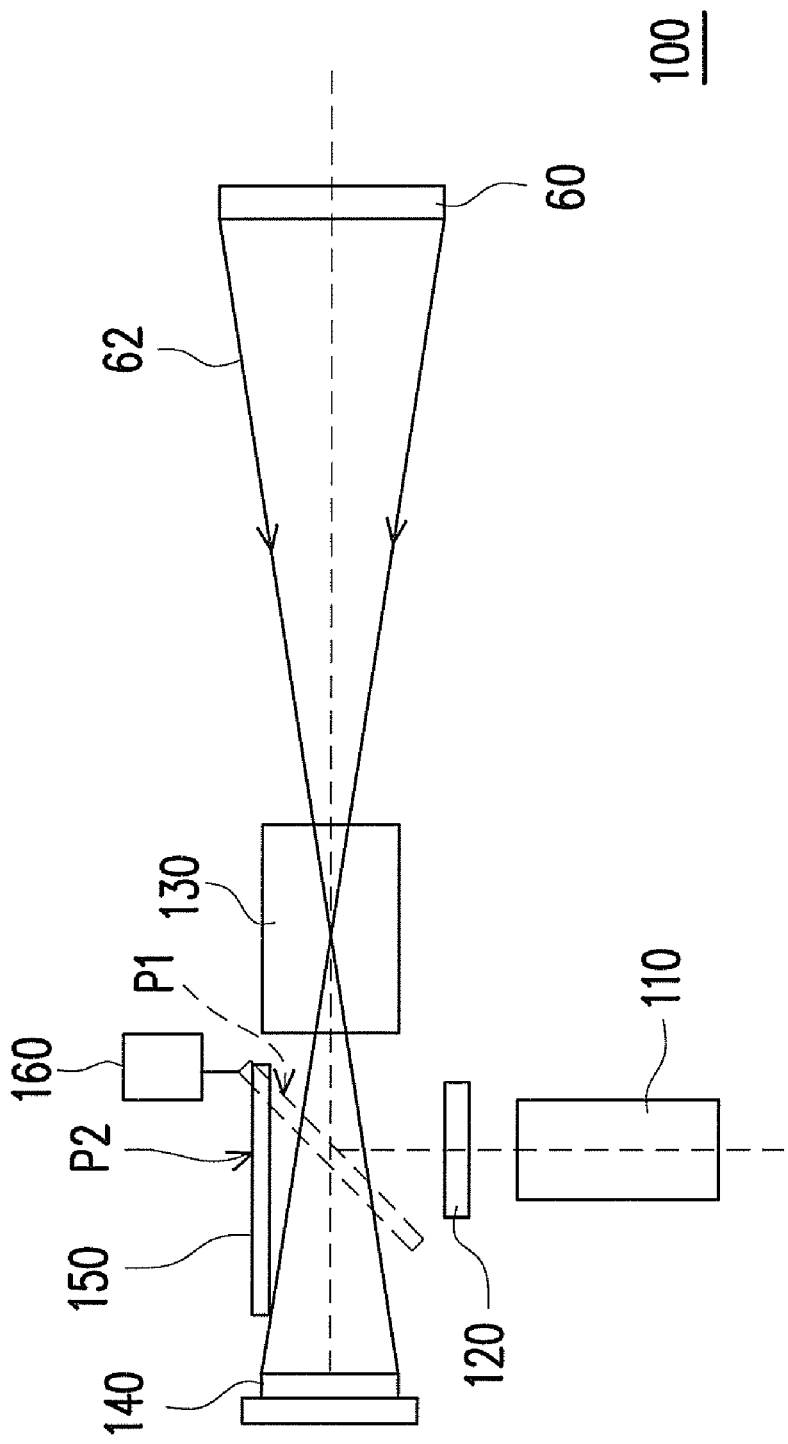
FIG. 1B is a structural diagram illustrating a conventional image projection and detection apparatus of FIG. 1A in an image detecting state.
Figure 2:
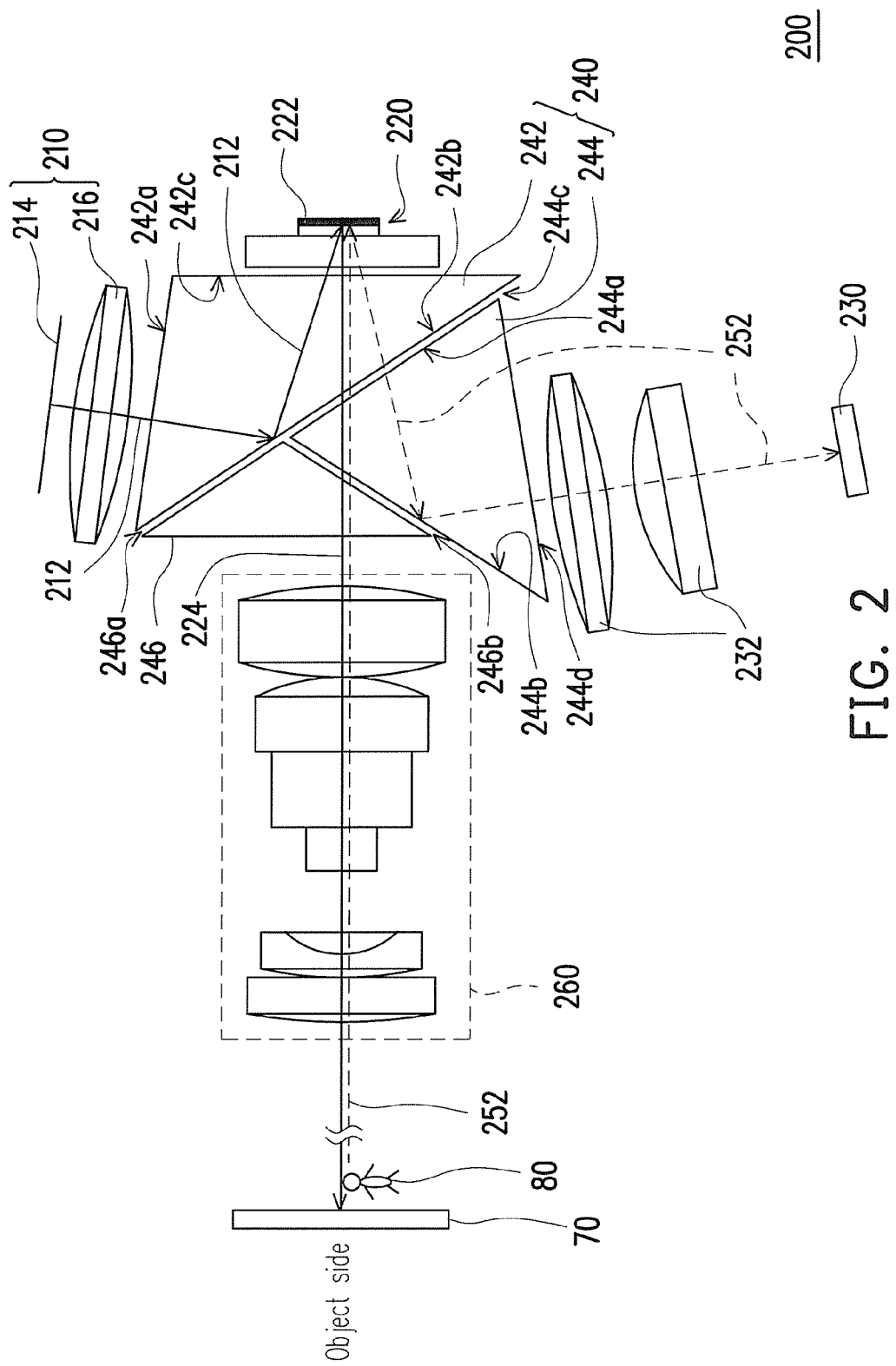
FIG. 2 is a structural diagram illustrating an image projection and detection apparatus according to an embodiment of the invention.

FIG. 2 is a structural diagram illustrating an image projection and detection apparatus according to an embodiment of the invention. Referring to FIG. 2, the image projection and detection apparatus 200 of this embodiment includes an illumination system 210, a DMD 220, an optical detector 230 and a TIR unit 240. The illumination system 210 is capable of providing an illumination beam 212. In the present embodiment, the illumination system 210 includes a light source 214 and at least a first lens 216, wherein the light source 214 is capable of providing the illumination beam 212, and the first lens 216 is disposed in the optical path of the illumination beam 212. To be specific, the light source 214 is, for example, a light emitting diode (LED), an ultra high pressure (UHP) lamp or other suitable light-emitting devices, and the first lens 216 converges the illumination beam 212 emitted from the light source 214, and transmits it to the TIR unit 240.

The TIR unit 240 includes a first prism 242 and a second prism 244. The first prism 242 has a light-incident surface 242a and a first total reflection surface 242b. The illumination beam 212 from the illumination system 210 enters the first prism 242 through the light-incident surface 242a, and is totally reflected to the DMD 220 by the first total reflection surface 242b. In the present embodiment, the first prism 242 further has a second optical surface 242c, wherein the illumination beam 212 totally reflected by the first total reflection surface 242b passes through the second optical surface 242c and is transmitted to the DMD 220. The second prism 244 has a first optical surface 244a and a second total reflection surface 244b, wherein a first gap 244c is maintained between the first optical surface 244a and the first total reflection surface 242b, so that the first total reflection surface 242b has a total reflection function. In the present embodiment, the first gap 244c is, for example, an air gap. However, in other embodiments, the first gap 244c may also be other gas gaps or a vacuum gap.

Figure 3:
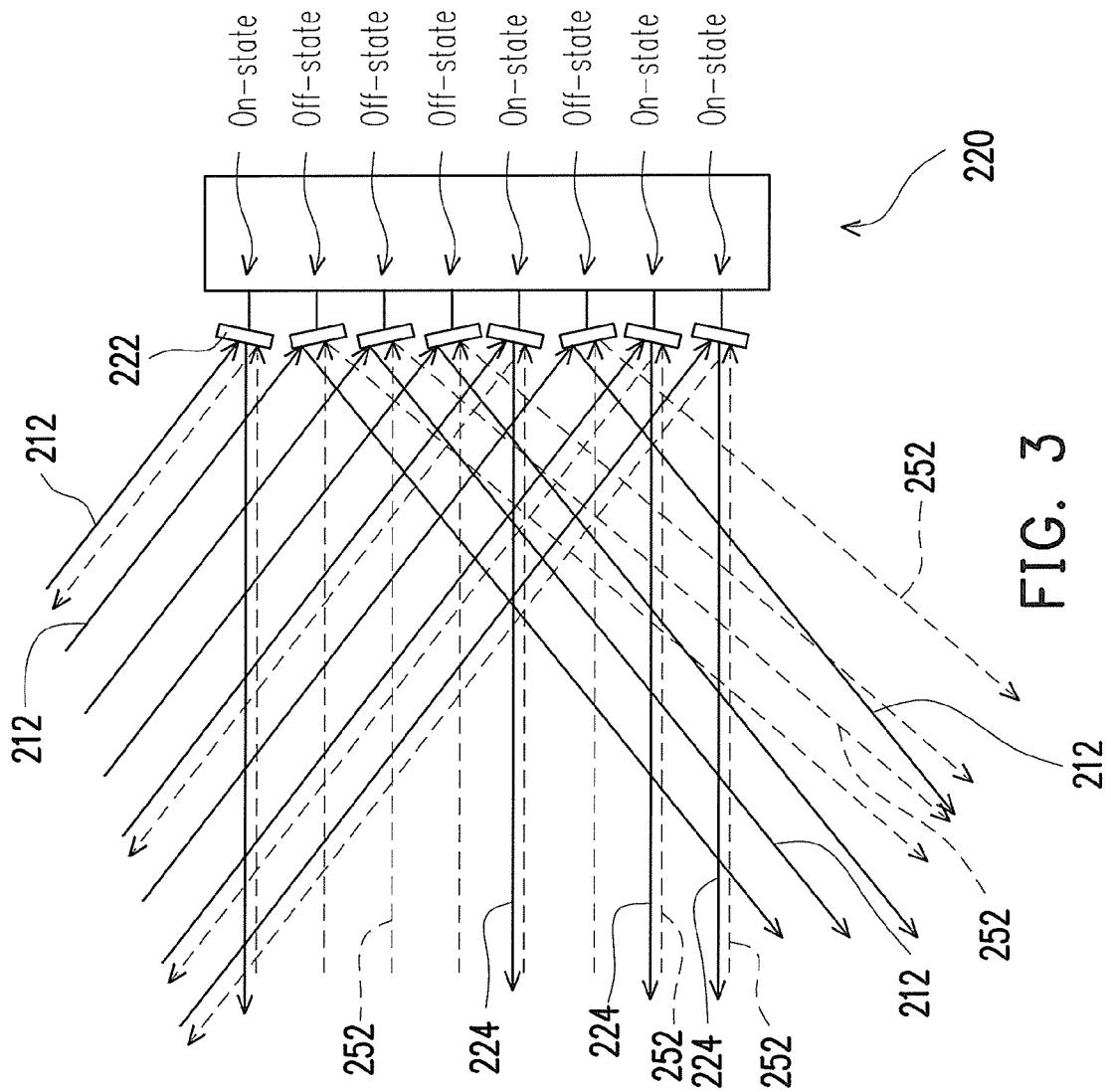
FIG. 3 is an amplification diagram of the DMD of FIG. 2.

FIG. 3 is an amplification diagram of the DMD of FIG. 2. Referring to FIG. 2 and FIG. 3, the DMD 220 is disposed in the optical path of the illumination beam 212, and includes a plurality of micro-mirror structures 222. Each of the micro-mirror structure 222 is capable of being switched between an on-state and an off-state. When at least a part of the micro-mirror structures 222 are in the on-state, they reflect the illumination beam 212 into an image beam 224, and the image beam 224 is transmitted to an object side. To be specific, the image beam 224 formed by the reflection of at least a part of the micro-mirror structures 222 in the on-state passes through the first total reflection surface 242b and is transmitted to the object side.

In the present embodiment, the image projection and detection apparatus 200 further includes an imaging lens 260. The imaging lens 260 is disposed in the optical paths of the image beam 224 and an object beam 252, and is disposed between the object side and the TIR unit 240. When the image projection and detection apparatus 200 performs image projection, the imaging lens 260 projects the image beam 224 from the DMD 220 to a screen 70 at the object side to form image frames. Moreover, to achieve a better display quality during the image projection of the image projection and detection apparatus 200, when the image beam 224 formed by the reflection of at least a part of the micro-mirror structures 222 in the on-state is transmitted to the object side, an f-number of the imaging lens 260 falls within a range of, for example, 2.0 to 2.4, i.e. an aperture thereof is relatively great, so that the projected image frames have a relatively high luminance.

As described above, when the image projection and detection apparatus 200 performs the image projection, the optical path of the image beam 224 is formed by the on-state of the micro-mirror structures 222 of the DMD 220, and in coordination with the TIR unit 240 and the imaging lens 260, a better projection effect is achieved.

Moreover, when the image projection and detection apparatus 200 performs the image detection, the optical path of the object beam 252 is formed by the off-state of the micro-mirror structures 222 of the DMD 220, and also in coordination with the TIR unit 240 and the imaging lens 260, a better detection effect is achieved, which is described in detail below.

The object beam 252 from the object side passes through the first total reflection surface 242b of the first prism 242, and is transmitted to the DMD 220, wherein the object beam 252 is, for example, a light beam reflected by or emitted from an object 80. In the present embodiment, the object beam 252 passes through the second optical surface 242c and is transmitted to the DMD 220. In other words, the object beam 252 from the object side sequentially passes through the first total reflection surface 242b and the second optical surface 242c of the first prism 242, and is transmitted to the DMD 220.

Next, when at least a part of the micro-mirror structures 222 of the DMD 220 are in the off-state, the DMD 220 reflects the object beam 252 from the object side to the optical detector 230. In the present embodiment, the object beam 252 reflected by the at least a part of the micro-mirror structures 222 in the off-state sequentially passes through the second optical surface 242c, the first total reflection surface 242b, the first gap 244c and the first optical surface 244a, and is totally reflected to the optical detector 230 by the second total reflection surface 244b. In the present embodiment, the second prism 244 further has a third optical surface 244d. To be specific, the object beam 252 totally reflected by the second total reflection surface 244b passes through the third optical surface 244d, and is transmitted to the optical detector 230, so that the optical detector 230 may detect an image of the object 80. In the present embodiment, the optical detector 230 is, for example, a charge coupled device (CCD) or a complementary metal oxide semiconductor (CMOS) detecting device.

Similarly, to achieve a better image quality of the image projection and detection apparatus 200 during the image detection, when the object beam 252 reflected by the at least a part of the micro-mirror structures 222 in the off-state is transmitted to the optical detector 230, an f-number of the imaging lens 260 falls within a range of 2.8 to 3.5. Therefore, the image formed on the optical detector 230 may have a suitable luminance.

In the present embodiment, the image projection and detection apparatus 200 further includes a third prism 246. The third prism 246 is disposed beside the first prism 242 and the second prism 244, wherein the image beam 224 from the DMD 220 sequentially passes through the first total reflection surface 242b and the third prism 246. In detail, the object beam 252 from the object side sequentially passes through the third prism 246 and the first total reflection surface 242b and is transmitted to the DMD 220. Moreover, a second gap 246a is maintained between the third prism 246 and the first total reflection surface 242b, and a third gap 246b is maintained between the third prism 246 and the second total reflection surface 244b. To be specific, the first gap 244c, the second gap 246a and the third gap 246b are, for example, air gaps, so that the illumination beam 212 from the light-incident surface 242a may be totally reflected by the first total reflection surface 242b, and the object beam 252 reflected by the at least a part of the micro-mirror structures 222 in the off-state may be totally reflected by the second total reflection surface 244b. The total reflection is achieved by the different refractive indexes between the prism and the gap, which is known by those skilled in the art, so that detailed description thereof is omitted. In other embodiments, the first gap 244c, the second gap 246a and the third gap 246b may also be other gas gaps or vacuum gaps.

According to the above description, in the image projection and detection apparatus 200 of the present embodiment, the optical paths of the image beam 224 and the object beam 252 are respectively formed by the on-state and the off-state of the micro-mirror structures 222 of the DMD 220, so as to respectively achieve the image projection and the image detection functions. Moreover, the illumination beam 212, the image beam 224 and the object beam 252 may be refracted or totally reflected in coordination with the application of the TIR unit 240, so that the image beam 224 may be projected via the imaging lens 260, and the object beam 252 may be imaged to the optical detector 230. Therefore, the image projection and detection apparatus 200 may commonly use relatively more devices (for example, the imaging lens, the TIR unit and the DMD, etc.) during the image projection and the image detection, and generation of the optical paths based on other devices or an actuator during the image projection and the image detection is unnecessary. Therefore, the image projection and detection apparatus 200 of the present embodiment has a relatively simple structure, and accordingly has a relatively small size and a low cost.

In the present embodiment, the imaging lens 260 is, for example, a zoom lens, so that the image projection and detection apparatus 200 may project different size images to the screen 70 in different distances, and the object 80 in different distances may be imaged to the optical detector 230.

Figure 4:
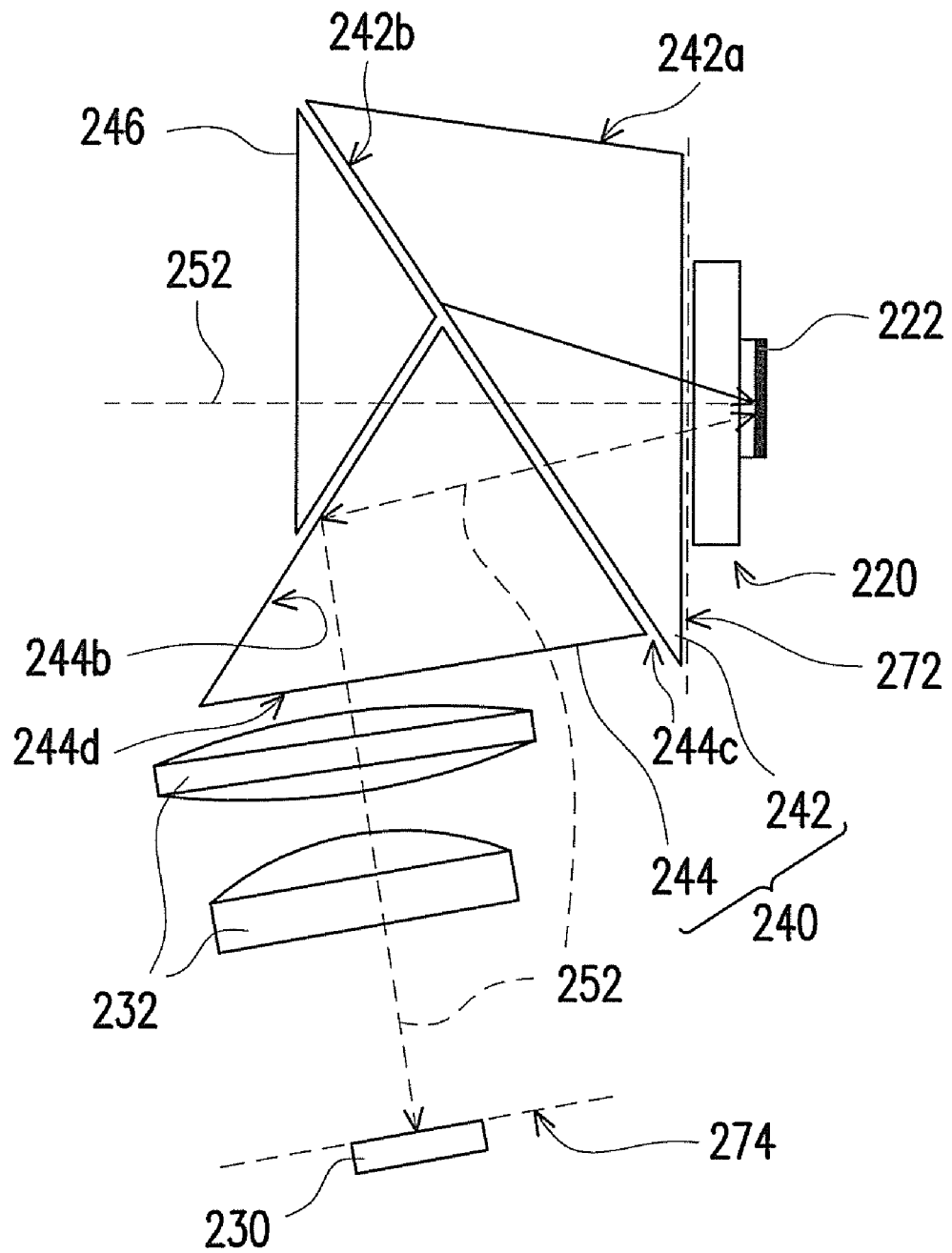
FIG. 4 is a local diagram illustrating an image projection and detection apparatus in an image detecting state.

FIG. 4 is a local diagram illustrating an image projection and detection apparatus in an image detecting state. Referring to FIG. 2 and FIG. 4, when the image projection and detection apparatus 200 performs the image detection, the object beam 252 from the object side sequentially passes through the second total reflection surface 244b and the first total reflection surface 242b to form a first imaging plane 272 between the DMD 220 and the object side, and the object beam 252 is reflected to the optical detector 230 by at least a part of the micro-mirror structures 222 in the off-state, and forms a second imaging plane 274 on the optical detector 230. To be specific, the first imaging plane 272 is formed via a focusing function of the imaging lens 260, and the second imaging plane 274 is formed via a focusing function of at least a second lens 232, wherein the second lens 232 is disposed in the optical path of the object beam 252, and is disposed between the second prism 244 and the optical detector 230.

Generally, if the first imaging plane 272 is disposed on the DMD 220, since gaps among the micro-mirror structures 222 may divide the image, when the object beam 252 is transmitted to the optical detector 230 and forms the second imaging plane 274 on the optical detector 230, the second image is also divided into a plurality of small blocks by the images of the gaps, so that a detection quality is decreased, which is a so-called window effect. To resolve the above problem, a zoom lens may be applied as the imaging lens 260, so that the first imaging plane 272 of the object beam 252 is formed between the DMD 220 and the object side instead of being formed on the DMD 220. By such means, generation of the window effect may be effectively avoided, and therefore the second image formed on the second imaging plane 274 on the optical detector 230 may have a better imaging quality.

In summary, in the image projection and detection apparatus according to the embodiments of the present invention, the optical paths of the image beam and the object beam are respectively formed by the on-state and the off-state of the micro-mirror structures of the DMD, so as to respectively achieve the image projection and the image detection functions. Therefore, generation of the optical paths based on other devices or the actuator is unnecessary. By such means, the image projection and detection apparatus may have a relatively simple structure, and accordingly have a relatively small size and a low cost. Moreover, during the image detection, in the image projection and detection apparatus according to the embodiments of the present invention, the first imaging plane of the object beam is disposed between the object side and the DMD to avoid the window effect, so that the image projection and detection apparatus may have a better imaging quality during the image detection.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. An image projection and detection apparatus, comprising:
    an illumination system, capable of providing an illumination beam;
    a digital micro-mirror device, disposed in an optical path of the illumination beam and comprising a plurality of micro-mirror structures, wherein each of the micro-mirror structures is capable of being switched between an on-state and an off-state, at least a part of the micro-mirror structures reflect the illumination beam into an image beam when in the on-state, and the image beam is transmitted to an object side;
    an optical detector, wherein at least a part of the micro-mirror structures reflect an object beam from the object side to the optical detector when in the off-state; and
    a total internal reflection unit, comprising:
        a first prism, having a light-incident surface and a first total reflection surface, wherein the illumination beam from the illumination system enters the first prism through the light-incident surface, and is totally reflected to the digital micro-mirror device by the first total reflection surface, the image beam formed by the reflection of at least a part of the micro-mirror structures in the on-state passes through the first total reflection surface and is transmitted to the object side, and the object beam from the object side passes through the first total reflection surface and is transmitted to the digital micro-mirror device; and
        a second prism, having a first optical surface and a second total reflection surface, wherein a first gap is maintained between the first optical surface and the first total reflection surface, the object beam reflected by at least a part of the micro-mirror structures in the off-state sequentially passes through the first total reflection surface, the first gap and the first optical surface, and is then totally reflected to the optical detector by the second total reflection surface.

2. The image projection and detection apparatus as claimed in claim 1 further comprising an imaging lens disposed in optical paths of the image beam and the object beam and disposed between the object side and the total internal reflection unit.

3. The image projection and detection apparatus as claimed in claim 2, wherein the imaging lens is a zoom lens.

4. The image projection and detection apparatus as claimed in claim 2, wherein an f-number of the imaging lens falls within a range of 2.0 to 2.4 when the image beam formed by the reflection of at least a part of the micro-mirror structures in the on-state is transmitted to the object side.

5. The image projection and detection apparatus as claimed in claim 2, wherein an f-number of the imaging lens falls within a range of 2.8 to 3.5 when the object beam reflected by at least a part of the micro-mirror structures in the off-state is transmitted to the optical detector.

6. The image projection and detection apparatus as claimed in claim 1, wherein the illumination system comprises:
    a light source, capable of providing the illumination beam; and
    at least a first lens, disposed in the optical path of the illumination beam, and disposed between the light source and the first prism.

7. The image projection and detection apparatus as claimed in claim 1, wherein the object beam form the object side sequentially passes through the second total reflection surface and the first total reflection surface to form a first imaging plane between the digital micro-mirror device and the object side, and the object beam is reflected to the optical detector by at least a part of the micro-mirror structures in the off-state to form a second imaging plane on the optical detector.

8. The image projection and detection apparatus as claimed in claim 1, wherein the optical detector is a charge coupled device or a complementary metal oxide semiconductor detecting device.

9. The image projection and detection apparatus as claimed in claim 1 further comprising a second lens disposed in the optical path of the object beam and disposed between the second prism and the optical detector.

10. The image projection and detection apparatus as claimed in claim 1 further comprising a third prism, disposed beside the first prism and the second prism, wherein the image beam from the digital micro-mirror device sequentially passes through the first total reflection surface and the third prism, the object beam from the object side sequentially passes through the third prism and the first total reflection surface and is transmitted to the digital micro-mirror device, a second gap is maintained between the third prism and the first total reflection surface, and a third gap is maintained between the third prism and the second total reflection surface.

11. The image projection and detection apparatus as claimed in claim 1, wherein the first prism further has a second optical surface, the illumination beam totally reflected by the first total reflection surface passes through the second optical surface and is transmitted to the digital micro-mirror device, and the object beam passes through the second optical surface and is transmitted to the digital micro-mirror device.

12. The image projection and detection apparatus as claimed in claim 1, wherein the second prism further has a third optical surface, the object beam totally reflected by the second total reflection surface passes through the third optical surface and is transmitted to the optical detector.

* * * * *